(12) United States Patent
Zheng et al.

(10) Patent No.: US 12,457,136 B2
(45) Date of Patent: Oct. 28, 2025

(54) METHOD FOR MODULATION USING INDEX OF LOW-POWER FREQUENCY POINTS, TRANSMITTER, AND RECEIVER THEREOF

(71) Applicant: Xiamen Zifisense InfoTech Co., Ltd., Fujian (CN)

(72) Inventors: Delai Zheng, Fujian (CN); Zhuoqun Li, Fujian (CN)

(73) Assignee: Xiamen Zifisense InfoTech Co., Ltd., Xiamen (CN)

( * ) Notice: Subject to any disclaimer, the term of this patent is extended or adjusted under 35 U.S.C. 154(b) by 2 days.

(21) Appl. No.: 18/607,500

(22) Filed: Mar. 17, 2024

(65) Prior Publication Data

US 2024/0223418 A1 Jul. 4, 2024

Related U.S. Application Data

(63) Continuation of application No. PCT/CN2022/079931, filed on Mar. 9, 2022.

(30) Foreign Application Priority Data

Sep. 16, 2021 (CN) .......................... 202111089039.1

(51) Int. Cl.
*H04L 27/12* (2006.01)
*H04L 27/26* (2006.01)
*H04L 27/28* (2006.01)

(52) U.S. Cl.
CPC .......... *H04L 27/12* (2013.01); *H04L 27/2636* (2013.01); *H04L 27/28* (2013.01)

(58) Field of Classification Search
CPC ...... H04L 27/12; H04L 27/2636; H04L 27/28
See application file for complete search history.

(56) References Cited

U.S. PATENT DOCUMENTS

| | | | |
|---|---|---|---|
| 10,985,962 B1 | 4/2021 | Sahin et al. | |
| 2014/0064402 A1* | 3/2014 | Kim | H04L 27/38 |
| | | | 375/273 |
| 2016/0294498 A1* | 10/2016 | Ma | H04L 27/2647 |

FOREIGN PATENT DOCUMENTS

| | | |
|---|---|---|
| CN | 106130656 A | 11/2016 |
| CN | 111432490 A | 7/2020 |

(Continued)

OTHER PUBLICATIONS

Corresponding International Patent Application No. PCT/CN2022/079931, International Search Report, dated Jun. 10, 2022.

(Continued)

*Primary Examiner* — Rahel Guarino
(74) *Attorney, Agent, or Firm* — Cooper Legal Group, LLC (57) ABSTRACT

A method for modulation using an index of frequency points, a transmitter, and a receiver. The method comprises obtaining M frequency points $[f_0 \ldots f_k \ldots f_{M-1}]$ for orthogonal modulation in a frequency domain, wherein M is a power of 2, and the M frequency points are continuous or discontinuous; transmitting information bits based on a number of $\log_2(M)$, and selecting a frequency point k through mapping the M frequency points; and transmitting the frequency point k using frequency shift keying (FSK) modulation, wherein a modulation signal is $s(t)=\cos(f_c t+ 2\pi*f_k t)$, $f_c$ is a frequency point of a carrier, and t is time.

16 Claims, 4 Drawing Sheets

(56) References Cited

FOREIGN PATENT DOCUMENTS

| CN | 112311711 A | 2/2021 |
| CN | 112583750 A | 3/2021 |
| CN | 113746768 A | 12/2021 |

OTHER PUBLICATIONS

Corresponding International Patent Application No. PCT/CN2022/079931, Written Opinion, dated Jun. 10, 2022.
Corresponding Chinese Patent Application No. 202111089039.1, First Office Action mailed Nov. 28, 2023.
Corresponding Chinese Patent Application No. 202111089039.1, Notification to Grant mailed Jan. 17, 2024.

* cited by examiner

Continuous CA

Discontinuous CA

Irregular CA

METHOD FOR MODULATION USING INDEX OF LOW-POWER FREQUENCY POINTS, TRANSMITTER, AND RECEIVER THEREOF

RELATED APPLICATIONS

This application is a continuation of International patent application PCT/CN2022/079931, filed on Mar. 9, 2022, which claims priority to Chinese patent application 202111089039.1, filed on Sep. 16, 2021. International patent application PCT/CN2022/079931 and Chinese patent application 202111089039.1 are incorporated herein by reference.

FIELD OF THE DISCLOSURE

The present disclosure relates to the field of communication technologies, and in particular relates to a method for modulation using an index of low-power frequency points, a transmitter, and a receiver.

BACKGROUND OF THE DISCLOSURE

Enhanced Mobile Broadband (eMBB) technologies, such as 5G, focus on spectral efficiency and transmission rates within a limited bandwidth. Low-Power Wide-Area Network (LPWAN) technologies require a long battery life (3-5 years), so the LPWAN technologies focus on energy efficiency, that is, transmission of each bit needs to use as little energy as possible. In a pursuit of ultimate energy efficiency, the LPWAN technologies can lose certain spectral efficiency.

Therefore, effectively utilizing transmission power and improving sensitivity of a receiver have become main objectives for developing LPWAN physical layer technology. First, utilization of transmission power is maximized, ensuring that LPWAN communication does not result in instant high power while maximizing energy efficiency (i.e. Peak-to-Average Power Ratio (PAPR)). In the design of a power amplifier, linearity is a very important factor. Due to the instant high power existing in a signal, in order to ensure a linearity index at a point of the instant high power, power backoff technology is usually used to ensure the linearity, so that the signal does not distort after passing through the power amplifier. The power backoff technology reduces energy efficiency, so it is necessary to find a way to reduce the PAPR. Second, a sensitivity of the receiver is improved, and a coverage distance is strengthened. If the sensitivity of the receiver is increased by 6 dB, i.e., 4 times, the coverage distance can be doubled.

The existing techniques comprise a Long Range Radio (LoRa) modulation technology based on ChirpSpread Spectrum (CSS). Cyclic shift in a time domain is performed for modulation, and cycling at different positions represents modulating various information bits. However, the disadvantages of the existing modulation techniques are that CSS signals are relatively complex.

BRIEF SUMMARY OF THE DISCLOSURE

The present disclosure provides a method for modulation using an index of low-power frequency points. The method comprises:

obtaining M frequency points [$f_0 \ldots f_k \ldots f_{M-1}$] for orthogonal modulation in a frequency domain, wherein M is a power of 2, and the M frequency points are continuous or discontinuous;

transmitting information bits based on a number of $\log_2(M)$, and selecting a frequency point k through mapping the M frequency points; and transmitting the frequency point k using frequency shift keying (FSK) modulation, wherein a modulation signal is $s(t)=\cos(f_c t+2\pi \ast f_k t)$, $f_c$ is a frequency point of a carrier, t is time, s(t) is function of time, and $f_k$ is a frequency of the frequency point k.

The method for modulation using the index of the frequency points, wherein a number of the M frequency points is $M=2^K$, wherein K is a number of the information bits configured to be modulated by one of symbols; a total occupied bandwidth is bandwidth (BW)=SCS×$2^K$, sub-carrier space (SCS) is a minimum frequency domain interval in the M frequency points, and the frequency domain interval between any two frequency points is an integer multiple of the SCS;

when the FSK modulation uses continuous frequency points, an interval of adjacent frequency points is the SCS;

when the FSK modulation uses discontinuous frequency points, some of adjacent frequency points are greater than the SCS, a time length of the one of the symbols is at least 1/SCS, the FSK modulation using the discontinuous frequency points comprises: selecting frequency bands to be discontinuous; and combining the frequency bands together for M-FSK modulation, mapping of scrambled frequency points at a transmission end are avoided according to known scrambled frequency points; or the FSK modulation using the discontinuous frequency points enables occupied frequency bands of a utilized bandwidth to be wider and reduce scrambling.

The method for modulation using the index of the frequency points, wherein the transmitting the frequency point k using the FSK modulation comprises selecting a transmission method based on an OFDM modulation, and the transmission method based on an orthogonal frequency-division multiplexing (OFDM) modulation comprises: determining that a number of the information bits modulated by each of symbols is $\log_2(M)$ based on a modulation order M of the FSK modulation; determining sub-carrier space (SCS) by a parameter of the SCS, and selecting M subcarriers to function as modulable subcarriers, wherein a total number of subcarriers of OFDM symbols is N, and the M subcarriers are continuous or discontinuous; encoding, interleaving, or scrambling the information bits, then selecting one subcarrier of the M subcarriers for modulating power based on a Gray mapping method or other mapping method, and setting other subcarrier of the M subcarriers to zero; and mapping, then transforming into a time domain through Inverse Fast Fourier Transform (IFFT), and adding corresponding cyclic prefixes according to a parameter of a time length of the OFDM symbols, then windowing in the time domain and filtering the OFDM symbols according to spectral leakage requirements.

The method for modulation using the index of the frequency points, wherein the FSK modulation comprises transmitting corresponding frequency points through a frequency control word, and the transmitting corresponding frequency points through the frequency control word specifically comprises: determining a number of the information bits modulated by each of symbols is $\log_2(M)$ based on a modulation order M of the FSK modulation; determining the M frequency points based on a parameter of sub-carrier space (SCS), the M frequency points can be continuous or discontinuous, wherein a space of any two frequency points of the M frequency points is an integer multiple of the SCS; encoding, interleaving, or scrambling the information bits; then selecting one subcarrier of M subcarriers for transmission based on a Gray mapping method and other mapping method, and determining a time length of the transmission by a time length of the symbols.

The method for modulation using the index of the frequency points, wherein the transmitting the frequency point k using the FSK modulation comprises: selecting an M-FSK transmission method using synchronous carrier aggregation (CA M-FSK modulation), wherein the CA M-FSK modulation comprises synchronous CA M-FSK modulation and asynchronous CA M-FSK modulation;

for the synchronous CA M-FSK modulation, wherein CA of the synchronous CA M-FSK modulation is aggregation of two or more carriers, each of the two or more carriers uses continuous M-FSK modulation or discontinuous M-FSK modulation, M is an order of different carriers of the two or more carriers, the order of the different carriers can be different, the synchronous carrier aggregation requires that a space of any two frequency points of all carriers is an integer multiple of the SCS and time lengths of symbols are the same; and for the asynchronous CA M-FSK modulation, two or more carriers uses the continuous M-FSK modulation or the discontinuous M-FSK modulation, and a parameter of the M-FSK modulation between the two or more carrier can be correlated or uncorrelated.

The method for modulation using the index of the frequency points, wherein the transmitting the frequency point k using the FSK modulation comprises determining a corresponding transmission rate based on adjustable bandwidths, sub-carrier space (SCS), a time length of a symbol modulated using the index of the frequency points, and parameters of a channel encoding rate.

The method for modulation using the index of the frequency points, wherein the mapping the M frequency points comprises: determining a number of the information bits of each of symbols modulated using the index of the frequency points to be $\log_2(M)$ based on a modulation order M of the FSK modulation; performing phase modulation with an order of N to obtain modulated information bits, and determining a number of the modulated information bits of each of the symbols is $\log_2(M)+\log_2(N)$, $s(t)=\cos(f_c t+2\pi*f_k t+\varphi_1+\phi)$, $\varphi_1 \in [\varphi_0, \varphi_1, \ldots \Phi_{N-1}]$, phases of the phase modulation are equidistant, and $\phi$ is an initial phase.

The method for modulation using the index of the frequency points comprises: using a baseband processing technique in combination with the method for modulation using the index of the frequency points, wherein the baseband processing technique comprise a forward channel encoding, interleaving, or scrambling, and the forward channel encoding is a convolutional code, a tail biting convolutional code, a polar code, or a block code.

The present disclosure further provides a transmitter, and the transmitter uses the method for modulation using the index of the frequency points.

The present disclosure further provides a receiver, the receiver uses a method using a receiver algorithm based on Fast Fourier Transform (FFT) adaptation, and the method comprises:

determining a sampling frequency (SR) based on signal bandwidth;
determining FFT size based on the SR and a time length T of the information symbols;
obtaining a sub-carrier space (SCS) size of modulated frequency points based on the time length T of the information symbols and an SCS by calculating;
filtering, based on a number M of M frequency points, the SCS size, the FFT size, and locations of frequency points mapped by a transmitting terminal; and
demodulating modulated information bits based on the locations of the frequency points or demodulating using soft bits.

The receiver, wherein the method comprises selecting an M-FSK transmission method using asynchronous carrier aggregation.

The receiver, wherein the receiver is configured to use a method of reception using multi antennas or hybrid automatic repeat request (HARQ) combination using multiple frames, and final demodulated soft bits are obtained by combining the soft bits respectively demodulated by the multiple antennas or the multiple frames.

The present disclosure has the following advantages.

The present disclosure can be modulated using either a method based on orthogonal frequency-division multiplexing (OFDM) or a frequency-shift keying (FSK) method. The modulation process is relatively simple and has good scalability, and a structure of a receiver is relatively simple.

BRIEF DESCRIPTION OF THE DRAWING

In order to more clearly describe embodiments of the present disclosure or the technical solutions in the existing techniques, the drawings used in the embodiments or the existing techniques are simply described below. It is obvious that the drawings described below are merely some embodiments described in the present disclosure, and other drawings can be obtained based on the drawings by a person of skill in the art.

DETAILED DESCRIPTION OF THE EMBODIMENTS

The technical solution of the embodiments of the present disclosure will be clearly and completely described below in combination with the drawings of the embodiments of the present disclosure. It is obvious that the described embodiments are merely some embodiments of the present disclosure instead of all embodiments. It is intended that the scope of the present disclosure covers all other embodiments provided that they are obtained without creative works by person of skill in the art.

Embodiment 1

Figure 1:
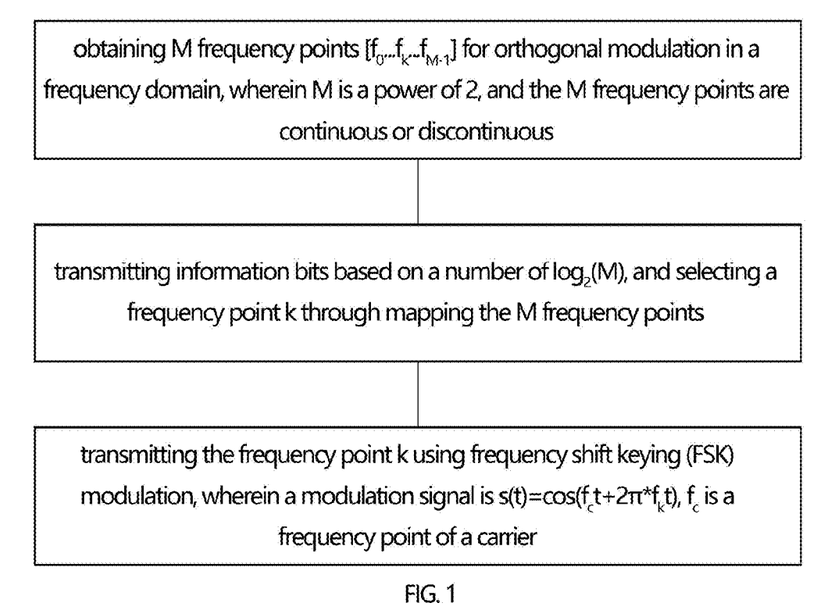
FIG. 1 is a flowchart of a method for modulation using an index of low-power frequency points of an embodiment of the present disclosure.

The embodiment of the present disclosure provides a method for modulation using an index of low-power frequency points. The method is applied to a transmitter, and, as shown in FIG. 1, the method comprises:

Step 110: obtaining M frequency points [$f_0 \ldots f_k \ldots f_{M-1}$] for orthogonal modulation in a frequency domain, wherein M is a power of 2, and the M frequency points can be continuous or discontinuous.

The embodiment of the present disclosure is based on a method for advanced multiple frequency-shift keying (M-FSK) modulation disclosed in Chinese application number 202011132046.0, which is incorporated herein by reference. The most important parameters of the advanced M-FSK modulation are as follows: a number of the M frequency points for the orthogonal modulation is M=$2^K$, wherein M frequency points can be continuous or discontinuous, K is a number of information bits modulated by a symbol, SCS is sub-carrier space, and CR is code rate. A total occupied bandwidth is BW=SCS×$2^K$, a time length of the symbol is at least 1/SCS, and a rate of the information bits is K*SCS*CR. Under a certain bandwidth, when the M is more, the SCS is smaller, i.e., the total occupied bandwidth is BW=SCS×$2^K$=SCS×M. A spectral efficiency is obtained to be K/$2^K$*CR by calculation. If there is no code, a theoretical spectral efficiency is K/$2^K$.

Table 1 shows a comparison of parameters of Lora commonly used in the Internet of Things and the advanced M-FSK modulation used in the present disclosure.

TABLE 1

Comparison of the parameters of the Lora and the advanced M-FSK modulation

| | Lora | Advanced M-FSK modulation | Notes |
| --- | --- | --- | --- |
| Number of modulated information bits | Time domain factor: spreading factor (SF) | frequency domain factor K | |
| Signal | CSS (Chirp-Spread-Spectrum) | 1 | |
| Bandwidth | Bandwidth (BW) | SCS × $2^K$ | |
| SCS | | SCS | Corresponding to 1/BW of the Lora |
| Time length of chip | 1/BW | | Corresponding to the SCS of the advanced M-FSK modulation |
| Time length of symbol | $2^{SF}$/BW | 1/SCS | |
| Rate of information bits | BW × SF/$2^{SF}$*CR | K*SCS*CR | |
| Spectral efficiency | SF/$2^{SF}$*CR | K/$2^K$* CR | |

Figure 2:
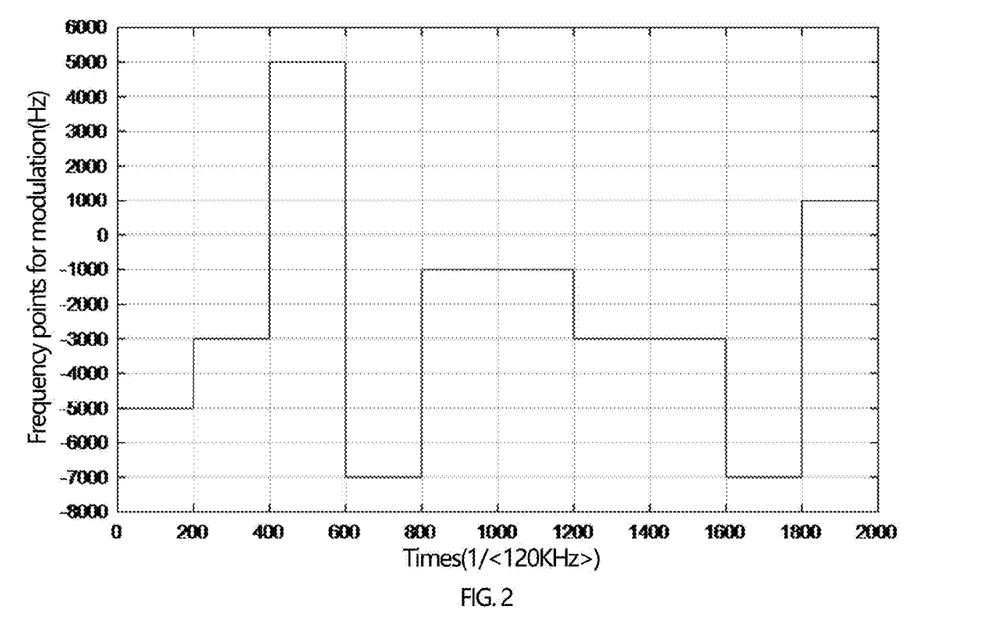
FIG. 2 is a diagram of modulation and transmission of frequency points.

Referring FIG. 2, when M=8, 3 information bits can be modulated using each of symbols and each of the frequency points. The SCS is 2 kHz. As intuitively shown in FIG. 2: ① information is modulated merely by varying in phase instead of using amplitudes, a peak to average power ratio (PAPR) is zero, and low power consumption characteristics are maintained; ② transmission power is constant, the bandwidth increases, and modulated bits increase (log$_2$(M)). In order to reduce spectral leakage, phase continuity between the symbols is maintained. If a requirement of the spectral leakage is further reduced, each of the symbols can be windowed in a time domain.

Step 120: transmitting the information bits based on a number of the log$_2$(M), and selecting a frequency point k through mapping.

Figure 3:
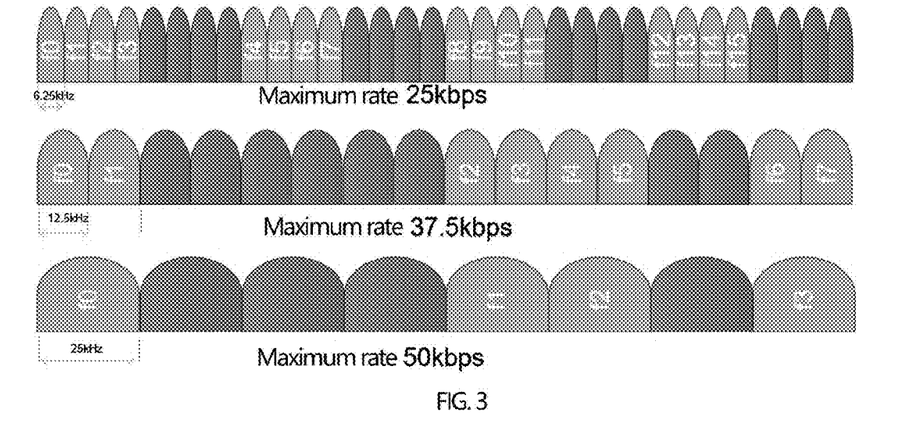
FIG. 3 is a diagram of discrete multiple frequency-shift keying (M-FSK) modulation.

The embodiment of the present disclosure specifically selects the frequency points for modulation by mapping discontinuous frequency points. The modulation is called discrete M-FSK modulation, and a requirement of the parameters is that a space of discontinuous frequency points should be an integer multiple of the SCS. Two main application scenarios are as follows: ① the bandwidth is particularly narrow and the transmission rate is particularly low to not meet some applications due to some limitations of the bandwidth. Therefore, frequency bands are selected to be discontinuous, and the frequency bands are combined together for the M-FSK modulation. For example, referring to FIG. 3, multiple 25 kHz bandwidths are combined together to improve the transmission rate. ② based on some of the frequency points being known to be scrambled, the scrambled frequency points can be avoided at a transmission end; ③ as the frequency points are wider, some conflicts can be better avoided. In FIG. 3, dark colored bands are available bands, while light colored bands are unavailable bands. A selection of the frequency points for the M-FSK modulation can be flexibly selected based on available frequency points. The SCS can also be flexible and variable according to requirements of the transmission rate.

Step 130: transmitting the frequency point k using frequency shift keying (FSK) modulation, i.e., a modulation signal s(t)=cos($f_c$t+2π*$f_k$t), and $f_c$ is a frequency point of carrier.

Figure 4:
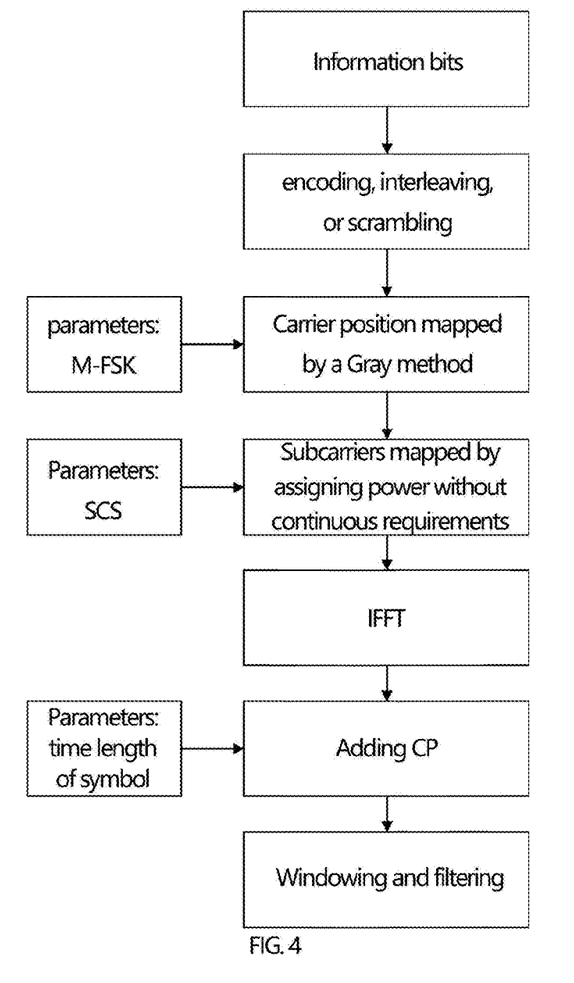
FIG. 4 is a diagram of a transmission process of a modulation and transmission method based on orthogonal frequency division multiplex (OFDM)

The embodiment of the present disclosure selects the following modulation methods for modulation and transmission:

(1) A Modulation and Transmission Method Based on Orthogonal Frequency Division Multiplex (OFDM):

The M-FSK modulation modulates information using the index of the frequency points based on OFDM modulation, i.e., one of the subcarriers in OFDM symbols is selected to modulate power, and the other of the subcarriers are set to zero (i.e. no power). A number of the information bits modulated by each of the symbols is determined as log$_2$(M) based on a modulation order M of the FSK modulation. Assuming that a total number of subcarriers in the OFDM symbols is N, a space of the subcarriers is determined by the SCS parameters, M subcarriers are selected as modulable subcarriers, the M subcarriers can be continuous or discontinuous, and the discontinuous subcarrier(s) is/are called discrete M-FSK modulation. After the information bits are encoded, interleaved, or scrambled, one of the subcarriers in the M subcarriers is selected for modulating power based on a Gray mapping method or other mapping methods, and the other of the subcarriers are set to be zero. After mapping, the OFDM symbols are transformed into the time domain through Inverse Fast Fourier Transform (IFFT), corresponding Cyclic Prefix (CP) is added based on time lengths of the OFDM symbols, and the OFDM symbols are then windowed and filtered in the time domain according to the specified requirement of the spectral leakage. The transmission process is shown in FIG. 4, and a key point of the transmission process is to merely select the one of the M subcarriers in the OFDM symbols according to a specified rule to perform energy assignment for transmission.

Figure 5:
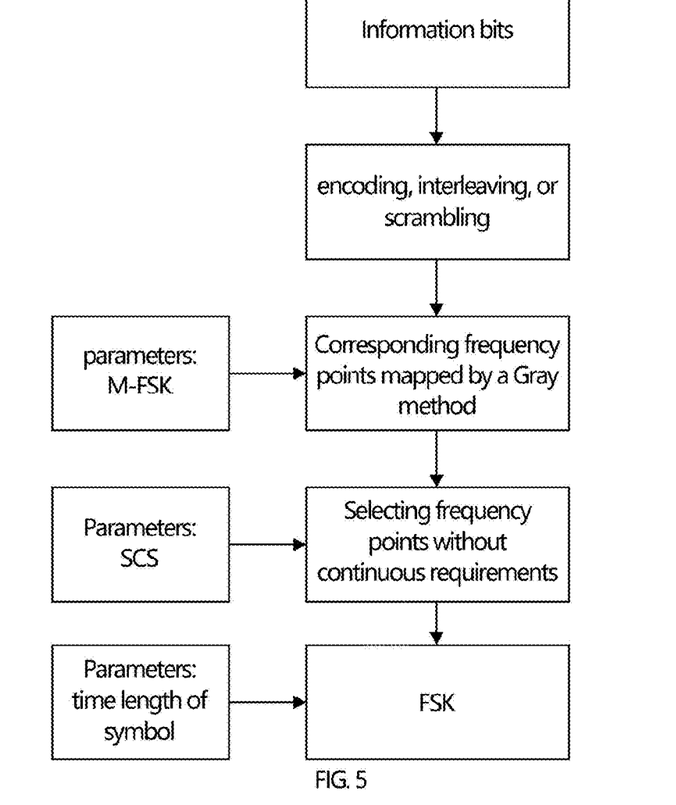
FIG. 5 is a diagram of a transmission process for directly selecting corresponding frequency points for transmission by a frequency control word.

(2) Directly Selecting Corresponding Frequency Points for Transmission by a Frequency Control Word, i.e., a Method for the FSK Modulation is as Follows:

The number of the information bits modulated by each of the symbols is determined as $\log_2(M)$ based on the modulation order M of the FSK modulation. M frequency points are determined based on the SCS parameters. The M frequency points are not necessarily continuous, and a space between any two frequency points needs to be an integer multiple of the SCS. After the information bits are encoded, interleaved, or scrambled, one of the M frequency points can be selected for transmission based on the Gray mapping method or the other mapping methods. A transmission time length is determined according to a length of the time lengths of the OFDM symbols. A transmission process is shown in FIG. 5.

Figure 6:
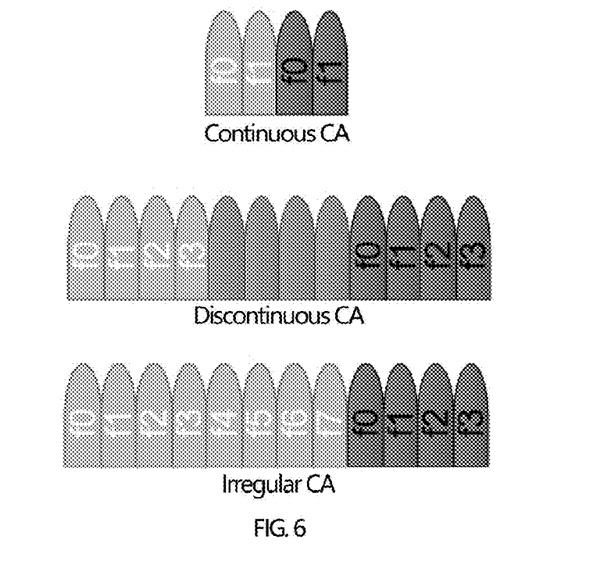
FIG. 6 is a diagram of M-FSK modulation and transmission using synchronous carrier aggregation.

(3) The M-FSK Modulation with Synchronous Carrier Aggregation (CA), i.e., CA M-FSK Modulations:

The CA M-FSK modulation comprises continuous CA M-FSK modulation and discontinuous CA M-FSK modulation. For synchronous CA M-FSK modulations, CA is an aggregation of two or more carriers, and an order of different carriers of the two or more carriers can be different. However, in order to be easily received by a receiver, a preset space of the frequency points is an integer multiple of the SCS, and lengths of the OFDM symbols are also the same. Thus, irregular bandwidths can be sufficiently utilized, spectral efficiency can also be improved, continuous bandwidths and discontinuous bandwidths are sufficiently utilized, and transmitted signals no longer have constant modulus characteristics. For asynchronous CA M-FSK modulation, two or more carriers are used for continuous or discontinuous M-FSK modulations, and the M-FSK parameters of the two or more carriers can be correlated or uncorrelated.

For example, referring to FIG. 6, assuming that 12 frequency points for modulation are divided into two groups, a first group has 8 frequency points, a second group has 4 frequency points. The 8 frequency points of the first group can modulate 3 information bits, and the 4 frequency points of the second group can modulate 2 information bits. At this time, a total of 5 information bits can be transmitted.

(4) The Method of the M-FSK Modulation Using Asynchronous Carrier Aggregation:

The asynchronous carrier aggregation does not have strict requirements for parameters of different carriers. SCSs can be different, the time lengths of the OFDM symbols can be different, modulation orders M can be different, and each of the different carriers needs to be independently received.

With respect to an encoding method, the embodiment of the present disclosure can reduce an encoding rate through a channel encoding by a tail biting convolutional code, or the embodiment of the present disclosure can reduce data rate and increase transmission quality by increasing transmission time length of each of the OFDM symbols. Increasing the transmission quality means increasing the transmission rate. The transmission rate is determined based on parameters, such as adjustable bandwidth, the SCS, the time length of the OFDM symbols of the M-FSK modulation, and a rate of the channel encoding. In order to avoid scrambling between the frequency points, a theoretical time length of the OFDM symbols is at least 1/SCS, i.e., a basic time length of the OFDM symbols. Increasing a bit rate is intended to increase any time length based on the basic time length of the OFDM symbols. The time length of the OFDM symbols becomes 2/SCS if repeated twice. The spectral efficiency is $K/2^K * CR/(1+CP)$ at this time, wherein CR is an encoding rate of forward error-correction of a wireless channel, and $1/(SCS*(1+CP))$ is a rate of the time length of the OFDM symbols. The characteristics of the method are that the time length of the OFDM symbols is variable, and a corresponding bit rate can be arbitrarily obtained, resulting in corresponding coverage increasing.

Assuming that the encoding rate is 1/2 and a bandwidth is 120 kHz, Table 2 shows different spectral efficiencies and transmission rates:

TABLE 2

| K | CR | CP | SCS (kHz) | Spectral efficiency (bit/S/Hz) | Rate (kbps) | CP1 (Multipath effect) | Rate 1 (kbps) |
|---|---|---|---|---|---|---|---|
| 1 | 1 | 0 | 60 | 1/2 | 60 | 0.3 | 46.15 |
| 2 | 1 | 0 | 30 | 1/2 | 60 | 0.15 | 52.17 |
| 3 | 1 | 0 | 15 | 3/8 | 45 | 0.075 | 41.86 |
| 4 | 1 | 0 | 7.5 | 1/4 | 30 | 0.038 | 28.90 |
| 5 | 1 | 0 | 3.75 | 5/32 | 18.75 | 0.019 | 18.40 |
| 6 | 1 | 0 | 3.75/2 | 3/32 | 11.25 | 0.01 | 11.14 |
| 7 | 1 | 0 | 3.75/4 | 7/128 | 6.5625 | 0.005 | 6.53 |
| 8 | 1 | 0 | 3.75/8 | 1/32 | 3.75 | 0.003 | 3.74 |
| 8 | 1/2 | 0 | 3.75/8 | 1/64 | 3.75/2 | 0.001 | 1.87 |

Figure 7:
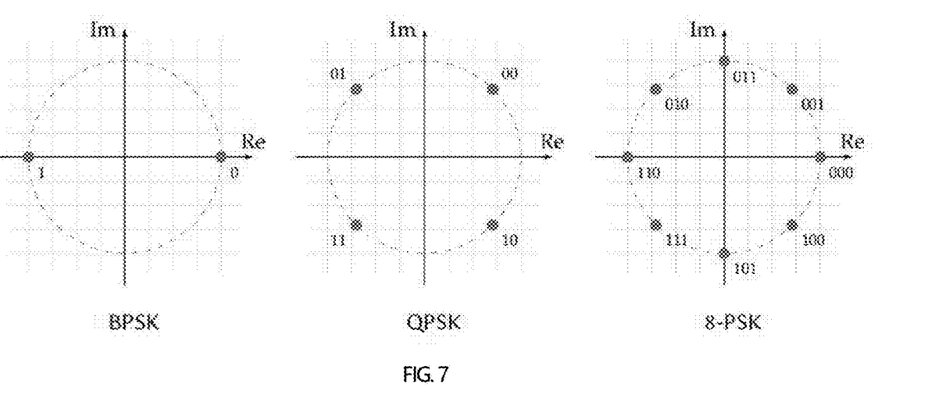
FIG. 7 is a diagram of a method for improving spectral efficiency by adding phase modulation to mapped frequency points.

In order to further improve the spectral efficiency, phase modulation can be added to mapped frequency points to improve the spectral efficiency based on the original modulation of the information bits by the index of the frequency points. For example, as shown in FIG. 7, in order to maintain PAPR=0 dB, samples are modulated by phase-shift keying (PSK), such as binary phase-shift keying (BPSK), quadrature phase-shift keying (QPSK), 8 phase-shift keying (8PSK), or noise phase-shift keying (NPSK). Each of corresponding symbols can transmit an additional 1 bit, 2 bits, 3 bits, or $\log_2(N)$ bits. The number of the modulated information bits of each symbol using the index of the frequency points is determined to be $\log_2(M)$ based on the modulation order M of the FSK modulation. The phase modulation is added to the modulated frequency points, and an order of the phase modulation is N. At this time, the number of modulated information bits of each symbol is $\log_2(M)+\log_2(N)$, $s(t)=\cos(f_c t+2\pi*f_K t+\varphi_1+\phi)$, $\varphi_1 \in [\varphi_0, \varphi_1, \ldots \varphi_{N-1}]$, phases are equidistant, and $\phi$ is an initial phase.

Figure 8:
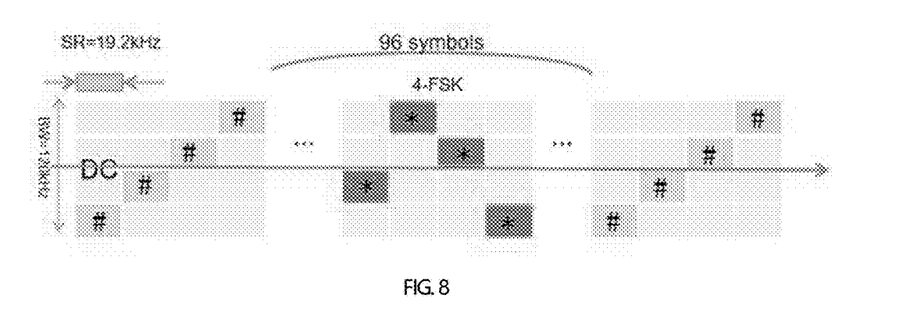
FIG. 8 is a diagram of a pilot frequency based on the M-FSK modulation.

In addition, the phase demodulation requires channel estimation, so a pilot frequency is required for the channel estimation. The following method is used: the pilot frequency modulated based on the M-FSK is transmitted every specified time, and transmission parameters and data can be similar or different. As shown in FIG. 8, # represents the pilot frequency, * represents data, and a phase of corresponding frequency points of each symbol for the M-FSK modulation is estimated through time-frequency interpolation.

For example, when the bandwidth is 120 kHz, and a carrier space is 30 kHz, the spectral efficiency shown in Table 3 is obtained by the phase modulation.

TABLE 3

| K | CR | Modulation | CP | SCS (KHz) | Spectral efficiency (bit/S/Hz) | Rate (Kbps) |
|---|---|---|---|---|---|---|
| 2 | 1 | 0 | 0 | 30 | 1/2 | 60 |
| 2 | 1 | BPSK | 0 | 30 | 1 | 120 |
| 2 | 1 | QPSK | 0 | 30 | 3/2 | 180 |
| 2 | 1 | 8PSK | 0 | 30 | 2 | 240 |

The method for modulation using the index of the frequency points of the present disclosure is a modulation technology that constitutes a wireless communication system with a better performance and also comprises other baseband processing, such as forward error coding (FEC), interleaving, and scrambling:

① The method for modulation using the index of the frequency points can be combined with any encoding technology, such as the FEC. The FEC comprises a convolutional code, a tail biting convolutional code (TBCC), a polar code, a turbo code, a block code, etc.

② The method for modulation using the index of the frequency points can be combined with any interleaving technology. The interleaving technology is used to randomize a position of bits with demodulation errors, avoiding continuous bit errors due to deep fading or scrambling in wireless channels. When the method for modulating using the index of the frequency points is used, the interleaving technology can construct a reasonable interleaver based on the time length of the symbols and a wireless channel environment.

③ The method for modulation using the index of the frequency points can be combined with any scrambling technique to randomize transmission signals.

Figure 9:
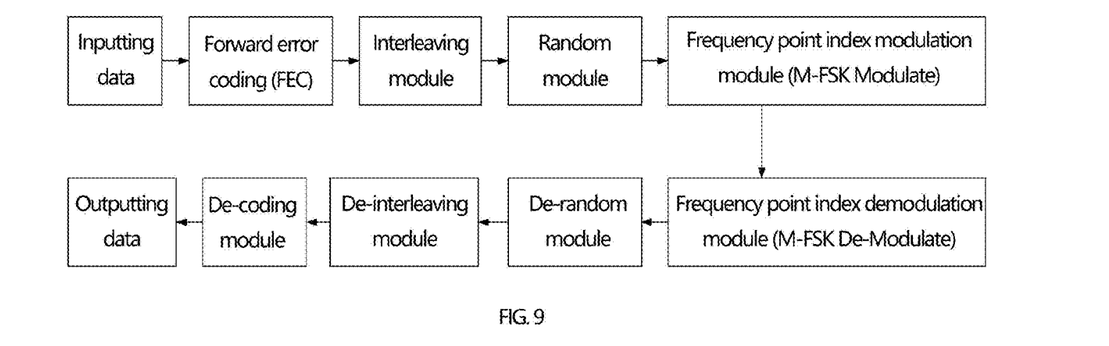
FIG. 9 is a diagram of a receipt and transmission process.

A whole transmission-receipt process is shown in FIG. 9. An FEC module, an interleaving module, a scrambling (Random) module, a frequency point index modulation (M-FSK Modulate) module, a frequency point index demodulation (M-FSK De-Modulate) module, a de-random module, a de-interleaving module, and a de-coding module are included. Data is input into the FEC module for data encoding, and the encoded data is input into the interleaving module to randomize the position of the bits with the demodulation errors to avoid the continuous bit errors due to the deep fading or the scrambling in the wireless channel. The data is then input into the scrambling module to randomize transmission signals, and the transmission signals then enter into the frequency point index modulation module for data modulation according to the modulation method of the present disclosure. The transmission signals sequentially enter into the frequency point index demodulation module, the de-random module, the de-interleave module, and the de-code module for demodulation, de-randomization, de-interleaving, and de-coding to output final data.

Further, in order to fully utilize energy of the transmission end, repeat request technology can be combined. For example, Hybrid automatic repeat request (HARQ) technology can also be used at a receiving end.

The embodiment of the present disclosure also provides a receiver, and the receiver adopts a receiver algorithm based on fast Fourier transform (FFT) adaptation. FFT size and a mapped frequency point position at the transmission end are determined based on the SCS and the time length T of the rate of the symbols by an appropriate sampling rate (SR). A single carrier M-FSK receiver is merely described. The receiver algorithm specifically comprises:

① The SR is determined by a signal bandwidth. The signal bandwidth $BW=SCS \times 2^K$, and the SR satisfies $SR \geq SCS \times 2^K$. When the SR is lager, noise immunity is higher. The SR is power of 2 as much as BW.

The FFT size is determined based on the SR and the time lengthen T of the symbols. A number of sampling points of each of the symbols is $OSR=SR*T$ and is filled up to at least $2^K$ by a zero padding method. If OSR values of M-FSK symbols exceed this point number (e.g., $2^K$), an appropriate n is selected to be $2^K \times 2^n$ by the zero padding method. A greatest advantage of this method is that all M-FSK energies are obtained. When the OFDM symbols have cyclic prefixes, a little bit of symbol energy before the symbols of the M-FSK modulation can be removed to reduce scrambling between the symbols.

A sub-carrier location space (SCS size) of the modulated frequency points is obtained based on the time lengthens T of the symbols and the SCS by calculating:

$$SCS \text{ size} = \text{ceil}\left((2^K \times 2^n)/(SR*(1/SCS))\right) = \text{ceil}(T*SCS)$$

Wherein ceil function is rounded up.

Filtering is performed according to the M, the SCS size, the FFT size, and locations of the mapped frequency points on the transmission end. Only values of the modulated frequency points are retained in the frequency domain, and other values are set to zero;

The modulated bits are demodulated based on frequency point positions or demodulated using soft bits. Amplitude magnitudes of corresponding modulated frequency points are compared, and frequency points where energy maximum values are located are therefore the modulated frequency points. The modulated bits are directly demodulated based on a corresponding relation between the determined location and the mapping method of the modulated frequency points. This method is hard demodulation. As an alternative method, each of the bits are separately demodulated, and energy at possible frequency points when each of the bits are 0 as well as the energy at the possible frequency points when each of the bits are 1 are counted, then subtracted and normalized accordingly to obtain demodulation credibility of the bit, also called the soft bits. This method is a soft demodulation method. Assuming that each of the bits is 0 or 1, energy at various frequency points when the bits are 0, as well as the energy at the various frequency point when the bits are 1, are counted, then subtracted, and normalized accordingly to obtain the demodulation credibility of the bit.

⑥ If there is encoding, the soft bits are inputted for corresponding decoding. If there is no encoding, the soft bits can be directly outputted by hard decision.

Example calculation: parameters are as follows: SCS=7.5 kHz; M=16 (i.e., K=4); and T=1/(4.8 kHz).

According to the calculation, $SR \geq 7.5*16=120$ kHz; SR=480 kHz, OSR=SR*T=100; FFT Size=128; SCS Size=ceil (T*SCS)=2.

According to M=16, FFT Size=128, and SCS Size=2, direct current (DC) carriers are cyclically shifted to a center position FFT Size/2+1=65, the location the frequency points is 0:2:128, and information is correspondingly demodulated based on the location of the modulated frequency points.

In addition, in order to increase coverage, the receiver can adopt a method of multi-antenna reception or HARQ combination to obtain final demodulated bits and enhance demodulation sensitivity by combining the soft bits respectively demodulated by multiple antennas or multiple frames (the soft bits are probability information in which each of the bits is 0 or 1, the soft bits are obtained by calculating based on the energy of each of the frequency points, and a certainty is larger when a signal-to-noise ratio is higher).

A repeat request combination process of the HARQ is specifically as follows: the characteristics of Internet of Things are burst, preamble and SYNC frames are included, and data part has a packet header. The packet header has a stronger demodulation ability than the data part, basic user information is included, and a focus is a sequence number of the repeat request of each frame. When the transmission end does not receive ACK feedback from the receiving end or feedbacks NACK, the transmission end resends the frame and adds one to the sequence number of the repeat request. When the receiving end receives the frame again, the sequence number of the repeat request of the frame is determined. If the demodulation is correct, a physical layer does not retain soft bit information of the frame. If the demodulation fails while the sequence number of the repeat request has reached a maximum number of the repeat request, the soft bit information of the frame is also not retained. If the maximum number of the repeat request has not been reached, the soft bit information of the frame is retained, and soft bit combination is performed when the receiving end receives the repeat request of the transmission end next time.

The aforementioned embodiments are used to further illustrate the objective, the technical solution, and the advantages of the present disclosure. It should be understood that the aforementioned embodiments are merely specific embodiments of the present disclosure, and the protective scope of the present disclosure is not limited thereto. Thus, it is intended that the present disclosure cover any modification, any equivalent replacement, and any improvement of this disclosure provided that they are made based on the technical solution of the present disclosure without creative works.

What is claimed is:

1. A method for modulation using an index of frequency points, comprising:
    obtaining M frequency points $[f_0 \ldots f_k \ldots f_{M-1}]$ for orthogonal modulation in a frequency domain, wherein M is a power of 2, and the M frequency points are continuous or discontinuous;
    transmitting information bits based on a number of $\log_2(M)$, and selecting a frequency point k through mapping the M frequency points; and
    transmitting the frequency point k using frequency shift keying (FSK) modulation, wherein a modulation signal is $s(t)=\cos(f_c t+2\pi*f_k t)$, $f_c$ is a frequency point of a carrier, t is time, s(t) is function of time, and $f_k$ is a frequency of the frequency point k.

2. The method for modulation using the index of the frequency points according to claim 1, wherein:
    a number of the M frequency points is $M=2^K$, wherein K is a number of the information bits configured to be modulated by one of symbols; a total occupied bandwidth is bandwidth (BW)=SCS×$2^K$, sub-carrier space (SCS) is a minimum frequency domain interval in the M frequency points, and a frequency domain interval between any two frequency points is an integer multiple of the SCS;
    when the FSK modulation uses continuous frequency points, an interval of adjacent frequency points is the SCS;
    when the FSK modulation uses discontinuous frequency points, some of adjacent frequency points are greater than the SCS, a time length of the one of the symbols is at least 1/SCS, the FSK modulation using the discontinuous frequency points comprises:
        selecting frequency bands to be discontinuous; and
        combining the frequency bands together for multiple frequency shift keying (M-FSK) modulation.

3. The method for modulation using the index of the frequency points according to claim 1, wherein:
    the transmitting the frequency point k using the FSK modulation comprises selecting a transmission method based on an orthogonal frequency-division multiplexing (OFDM) modulation, and
    the transmission method based on the OFDM modulation comprises:
        determining that a number of the information bits modulated by each of symbols is $\log_2(M)$ based on a modulation order M of the FSK modulation;
        determining sub-carrier space (SCS) by a parameter of the SCS, and selecting M subcarriers to function as modulable subcarriers, wherein a total number of subcarriers of OFDM symbols is N, and the M subcarriers are continuous or discontinuous;
        encoding, interleaving, or scrambling the information bits, then selecting one subcarrier of the M subcarriers for modulating power based on a mapping method, and setting other subcarriers of the M subcarriers to zero; and
        mapping, then transforming into a time domain through Inverse Fast Fourier Transform (IFFT), and adding corresponding cyclic prefixes according to a parameter of a time length of the OFDM symbols, then windowing in the time domain and filtering the OFDM symbols according to spectral leakage requirements.

4. The method for modulation using the index of the frequency points according to claim 1, wherein:
    the FSK modulation comprises transmitting corresponding frequency points through a frequency control word, and
    the transmitting the corresponding frequency points through the frequency control word comprises:
        determining a number of the information bits modulated by each of symbols is $\log_2(M)$ based on a modulation order M of the FSK modulation;
        determining the M frequency points based on a parameter of sub-carrier space (SCS), wherein a space of any two frequency points of the M frequency points is an integer multiple of the SCS;
        encoding, interleaving, or scrambling the information bits;
        then selecting one subcarrier of M subcarriers for transmission based on a mapping method; and
        determining a time length of the transmission by a time length of the symbols.

5. The method for modulation using the index of the frequency points according to claim 1, wherein:
    the transmitting the frequency point k using the FSK modulation comprises:
        selecting a multiple frequency shift keying (M-FSK) transmission method using synchronous carrier aggregation (CA M-FSK modulation), wherein the CA M-FSK modulation comprises synchronous CA M-FSK modulation and asynchronous CA M-FSK modulation;
    for the synchronous CA M-FSK modulation, wherein CA of the synchronous CA M-FSK modulation is aggregation of two or more carriers, each of the two or more carriers uses continuous M-FSK modulation or discontinuous M-FSK modulation, M is an order of different carriers of the two or more carriers, the CA M-FSK modulation requires that a space of any two frequency points of all carriers is an integer multiple of sub-carrier space (SCS) and time lengths of symbols are the same; and
    for the asynchronous CA M-FSK modulation, two or more carriers use the continuous M-FSK modulation or the discontinuous M-FSK modulation.

6. The method for modulation using the index of the frequency points according to claim 1, wherein:
the transmitting the frequency point k using the FSK modulation comprises determining a corresponding transmission rate based on adjustable bandwidths, sub-carrier space (SCS), a time length of a symbol modulated using the index of the frequency points, and parameters of a channel encoding rate.

7. The method for modulation using the index of the frequency points according to claim 1, wherein:
the mapping the M frequency points comprises:
determining a number of the information bits of each of symbols modulated using the index of the frequency points to be $\log_2(M)$ based on a modulation order M of the FSK modulation;
performing phase modulation with an order of N to obtain modulated information bits; and
determining a number of the modulated information bits of each of the symbols is $\log_2(M)+\log_2(N)$, $s(t)=\cos(f_c t+2\pi^* f_k t+\varphi_1+\phi)$, $\varphi_1 \cdot [\varphi_0, \varphi_1, \ldots \varphi_{N-1}]$, phases of the phase modulation are equidistant, and $\phi$ is an initial phase.

8. The method for modulation using the index of the frequency points according to claim 1, comprising:
using a baseband processing technique in combination with the method for modulation using the index of the frequency points, wherein:
the baseband processing technique comprise a forward channel encoding, interleaving, or scrambling, and
the forward channel encoding is a convolutional code, a tail biting convolutional code, a polar code, or a block code.

9. The method for modulation using the index of the frequency points according to claim 3, wherein the mapping method is a Gray mapping method.

10. The method for modulation using the index of the frequency points according to claim 4, wherein the M frequency points are continuous.

11. The method for modulation using the index of the frequency points according to claim 4, wherein the mapping method is a Gray mapping method.

12. The method for modulation using the index of the frequency points according to claim 5, wherein the order of the different carriers is different.

13. The method for modulation using the index of the frequency points according to claim 5, wherein a parameter of at least one of the continuous M-FSK modulation or the discontinuous M-FSK modulation between the two or more carriers is correlated.

14. A transmitter, wherein: the transmitter uses the method for modulation using the index of the frequency points according to claim 1.

15. A receiver, wherein:
the receiver uses a method using a receiver algorithm based on Fast Fourier Transform (FFT) adaptation, and
the method comprises:
determining a sampling frequency (SR) based on signal bandwidth;
determining FFT size based on the SR and a time length T of information symbols;
obtaining a sub-carrier space (SCS) size of modulated frequency points based on the time length T of the information symbols and an SCS by calculating;
filtering, based on a number M of M frequency points, the SCS size, the FFT size, and locations of frequency points mapped by a transmitting terminal; and
demodulating modulated information bits based on the locations of the frequency points or demodulating using soft bits.

16. The receiver according to claim 15, wherein:
the receiver is configured to use a method of reception using multiple antennas or hybrid automatic repeat request (HARQ) combination using multiple frames, and
final demodulated soft bits are obtained by combining the soft bits respectively demodulated by the multiple antennas or the multiple frames.

* * * * *